Jan. 7, 1964   A. E. GILCHRIST   3,116,827
EMULSION PAINT CONCENTRATE
Filed Aug. 17, 1960

3,116,827
EMULSION PAINT CONCENTRATE
Allan E. Gilchrist, Fairview Park, Ohio, assignor to The Glidden Company, Cleveland, Ohio, a corporation of Ohio
Filed Aug. 17, 1960, Ser. No. 50,087
22 Claims. (Cl. 206—47)

This invention relates to concentrate for air-drying latex emulsion paint and to custom-blending process for preparing aqueous emulsion paint therefrom.

Heretofore it has been the practice to mix together water, pigment, an aqueous compounded latex, proteinaceous bodying agent, and dispersing assistants into a latex emulsion paint, and to package said mixture for extended storage and eventual sale. Such paints are very popular because of their effectiveness and ease of application, e.g., Spred Satin, a trademark of The Glidden Company for such paint product. Because of the storage sensitivity of many otherwise worthwhile and desirable components towards reaction with the mixed ingredients in said conventional latex emulsion paint, e.g., with water or the latex, such storage-sensitive components ordinarily are avoided in conventional latex emulsion paint manufacture. Additionally, the water used in the paint composition amounts to approximately half the weight of such paint, and the paint must be packaged in efficient and often comparatively expensive containers to withstand normal handling and to avoid can corrosion, contamination, evaporation, and leakage.

In an effort to reduce the weight of water to be handled and shipped in the ultimate use of the latex paint, it has been proposed to make specialty powdered synthetic resin dispersions which, when mixed with water and conventional mineral pigment, constitute a suitable emulsion paint at the location of use. Such "dry" resins are generally more expensive than their aqueous latex counterparts and are a very restricted class of materials. In general, the so-called "dry" latex dispersions, which are finely powdered water-dispersible resins, must be used in a greater proportion than an aqueous compounded latex to do an equivalent coating job because their particle size is larger and they need a fusing or plasticizing agent to produce a continuous film.

The general art of paint concentrates is, however, broadly old and relates back to previous dry materials suitable for mixing with water to form surface coatings, e.g., calcimine, casein paints, and Portland cement paints. The advantages in performance and appeal of a true aqueous latex emulsion paint of the sort represented by U.S. Patent 2,709,689 over paints made from previously prepared dry mixtures are, however, well-known and have been responsible for the extensive public acceptance of such ready mixed paint.

Advantages of my invention over the various prior paint dry concentrates include economy, permissibility of a wider range of components, ease of application and attendant cleanup, and superior surface coating performance. Advantages of my invention over conventionally-packaged aqueous latex paint include, additionally, ease of application and far greater versatility and economy in packaging, in dispensing to the consumer, and in maintaining inventory at distributing outlets.

Further specific advantages of my invention over aqueous latex paints of the conventionally-packaged sort include the ability to eliminate substantially or to reduce the proportions of certain ingredients, e.g., proteinaceous substances, which require expensive equipment for preparation and formulation and/or contribute certain undesirable characteristics to paint, and to have in especially effective proportions and assembled conveniently in a combination with the ingredients, various reactive materials such as aluminum powder, cobalt driers, reactive colorants, agents imparting freeze-thaw stability to latex, certain intumescent salts, etc. for making the product of wider general utility without the danger of: coagulation and destruction of the latex; package instability; loss of shelf life; undue dilution with otherwise desirable materials which would render the eventual surface coating of poor service resistance; and even explosion of the container from gas generation or bacterial spoilage (which is a genuine concern in the preparation and distribution of latex paints).

Broadly, then, the advantages of my invention over prior practice include economy, permissibility of a wider range and proportion of effective components, versatility and economy in packaging, reduction of inventory for desired color effect, convenience in handling, and safety against spillage, package instability, and explosion.

Broadly, my concentrate is a multiunit combination comprising as ingredients a discrete pigment base unit containing water-insoluble pigment and water-dispersible bodying agent; and at least one discrete package unit of aqueous, compounded film-forming latex, the relative dry weight proportions of the latex solids fraction of said aqueous compounded latex to said pigment base in said combination being between about 1:1 and about 1:9. By "dry" weight I mean the weight of solids obtained after drying the ingredients at 100° C. to constant weight.

The process of my invention contemplates the custom production of aqueous latex emulsion paint, suitably in small quantities, e.g., 1 quart or less to about 50 gallons. It is especially adapted to such production at or near the point or use without extensive equipment. The process comprises: establishing and maintaining at least one discrete unit of pigment base, and separate therefrom, aqueous compounded film-forming latex, both of the sort hereinbefore described in connection with the concentrate; mixing in a mixing zone said pigment base unit and said aqueous latex in a relative dry weight ratio between about 1:1 and 1:9 latex solids: pigment base with 0.5–3 weight parts of additional water per weight part of pigment base unit and aqueous latex considered together; and withdrawing the resulting latex paint from the mixing zone.

In one aspect of the process the mixing zone can be the shipping container for the several ingredient packages, and the shipping container can be marked, as by printing or embossing, to indicate a level of additional water to be used which is particularly suitable for blending with the packages of pigment base and latex it contains. Thus, the user simply can add water to the predetermined mark in the container, disperses therein the accompanying package of pigment base, any other special dry ingredients such as aluminum powder that are desired, and then further adds the package of aqueous later, preferably in that order of addition, and stirs the whole with a simple paddle for a very short time until ostensible homogeneity is obtained in the resulting paint mixture.

Figure 1:
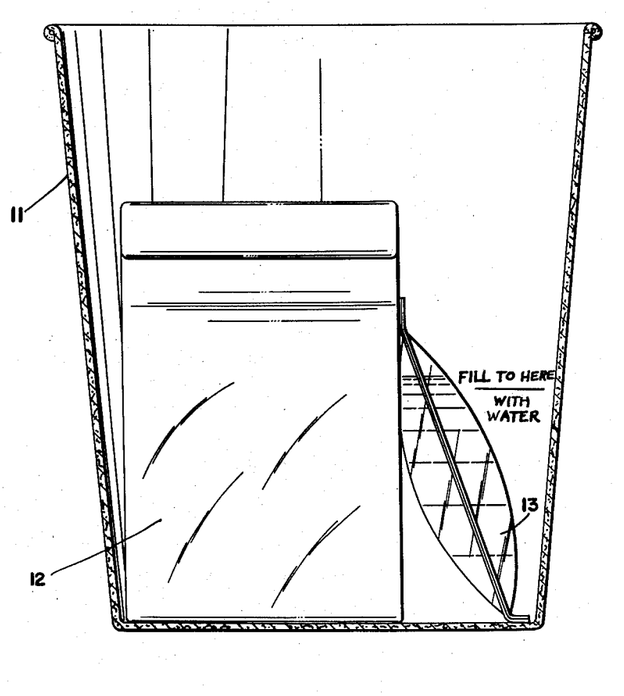
The drawing shows a cut away view of a mixing container, 11, open at the top, containing a package of pigment base, 12, and a package of the aqueous compounded latex 13. The container is marked with directions for addition of water.

The foregoing proportions of pigment base to latex solids are critical for the performance of the resulting paint made from my combination. Thus, if said ratio of latex solids to pigment base is substantially above 1:1, the resulting paint exhibits stickiness for undesirably prolonged periods, frequently is too glossy and is, accordingly, quite unsatisfactory. On the other hand, if this ratio is lower than about 1:9, the resulting surface coating is quite chalky and ineffective, losing durability. For best overall characteristics of drying, washability, surface appearance, and general durability, the ratio advantageously is not substantially lower than 1:6, and preferably it is between about 1:2.5 and 1:6.

The paint concentrate of my invention can have included in its combination one or more components sensitive to prolonged storage contact with the aqueous compounded latex or the pigment base. In some instances it is convenient to package said storage-sensitive component or components as part of the pigment base unit if the storage-sensitive component is comparatively inert towards the pigment base itself. Alternatively, the storage-sensitive component can be packaged apart from both the pigment base and the aqueous latex.

Such storage-sensitive components from the aqueous latex standpoint include metalliferous substances containing metals selected from the group consisting of groups 1, 2, 3, 4, 6, 7, and 8 of the periodic table, e.g., elemental copper powder, elemental zinc, caustic compounds of alkali or alkaline earth metals such as sodium hydroxide or lime, ammonium compounds (which will be considered here as equivalent to caustic alkalis), aluminum powder or flake, chromium powder, tin powder, molybdenum powder, manganese dioxide and organic manganese compounds such as manganese soaps, iron, cobalt, and nickel powders, cobalt salts and soaps such as cobalt acetate and cobalt naphthanate (which are useful for accelerating the cure of latices such as conventional butadiene-styrene latices, but which will cause premature coagulation if mixed and stored with the aqueous latex), intumescent salts such as ammonium phosphate, borax, antimony trichloride, mono- and diammonium phosphates, guanyl-urea phosphate, ureaformaldehyde resins, etc.

Thus, metal flakes, powders, and pastes can be a component of my combination available to the user. Accordingly, he can make with ease and safety an aluminum metallescent latex emulsion paint of a type heretofore avoided (because when finely-divided elemental aluminum is incorporated into a conventionally packaged aqueous latex paint and stored, the package can explode with great force and attendant danger, e.g., embedding a container lid into a plaster ceiling or other inanimate or animate object in the vicinity).

Also, greater control of paint drying can be obtained by the now permissible use of cobalt and similar driers which heretofore were avoided as components of conventionally packaged latex emulsion paints. Other metallescent finishes, e.g., bronze, iron, copper, etc. can now be furnished to the consumer safely and conveniently without danger of deleterious effects on the package, its contents, or its users and handlers, gassing, or dangerous explosive effects.

Additionally, flexible emulsion welding primers which require a high metallic content for welding or dip soldering can be made in convenient emulsion form in accordance with my invention. These are especially desirable because they do not require special cleaning of the primed metal surface for application of urethane-type enamels to wire or the like. Superior corrosion resisting additives such as chromates and phosphates of zinc or cadmium can also be incorporated into the final paint with convenience and safety. Fire-retardant paint mixtures heretofore avoided can be made with intumescent salts in the multipackage combination according to the precepts of my invention.

The versatility with safety and effectiveness permitted by my invention does not, of course, end with storage-sensitizing components and pigment base components by any means. Accordingly, the aqueous latex is made more effective for coating, for storage, and for imparting enormous variety of color hues and tints to the resulting paint by virtue of the invention.

Protective materials such as ethylene glycol, propylene glycol, butylene glycol, nonionic and tallow quaternary amine surfactants and other conventional soap-like materials can be added in very minor but effective proportions to the package or packages of aqueous compounded film-forming latex to better protect it from freezing. The effective concentration of these protective or "recovery" materials relative to the aqueous latex is much greater per unit weight of such recovery materials employed than when the same protective materials are used in a conventionally packaged aqueous latex paint. Accordingly, warehousing of my paint concentrate and applications of the resulting paint can be extended economically into freeze-thaw conditions of weather which are impractical with present conventional emulsion paints. In addition, because of the smaller but more effective proportions of such latex protective agents which now can be used because of my invention, the resulting paint film is rendered substantially less water-sensitive under service conditions than conventional latex paints containing enough of such recovery agents to do an equivalent protecting job.

The color variations possible with a comparatively low inventory of latex used in accordance with my invention are enormous. Thus, if in a quantity of my paint concentrate sufficient to make a gallon of resulting paint there are included a selection of four packages of aqueous latex, each of which is adequate for a quart of paint, from a stock of four standard colored latices which are red, yellow, blue, and white, the user has available 1,820 different tints on the basis of combinations of four such latex packages taken four at a time. With but a few more colored latex packages to select from, e.g., brown and black, the possible various tints and letdowns available become even higher. Importantly, also, such combinations are susceptible to very simple but extremely accurate color control and uniformity over virtually any size of marketing area.

The packaging of the aqueous latex can be made conventionally in so-called "pillow-packs," i.e., small, flexible plastic film packages of heat-sealed polyvinyl chloride and similar films, polyethylene films, etc.

Other improved packaging aspects of this invention, of course, include that of shipping the several discretely packaged components of latex, pigment base, etc. in a container which need not have a special top such as the conventional "triple-tight" seal, and even quite inexpensive paper containers can be used for assembling and delivering the multipackage combination of paint concentrate. The shipping weight of water, which ordinarily amounts to about 50% of the weight of a gallon of conventionally packaged latex paint, also is saved and the customer conveniently can carry home roughly 6 pounds of material for a gallon of his resulting paint rather than about 12 pounds or more. The preferred weight proportion of additional water to be added to my concentrate is between about 0.8 part and 1.2 parts per part of the concentrate combination and it can be as low as 0.5:1 or as high as 3:1, or even higher for spraying, e.g., 5 parts of additional water per part of concentrate.

The customer's package, in accordance with the precepts of my invention, can be a serviceable but inexpensive metal or paper pail or a disposable cheap plastic bottle such as one of polyethylene which is squeezable or rigid for mixing the paint in simple, neat, and rapid manner. Special durability to the customer's container can be imparted cheaply with interior lacquering, waxing, plastic film application or even metal foil lining. Larger containers can be made quite economically from asphalt-laminated paper drums or the like.

The combination of my invention can be tailor-made to accommodate various kinds of water indigenous to the localities of use, but ordinarily need not be specially compounded for the softness or hardness of domestic waters. The principal thing to avoid in ordinary domestic waters for the best painting results is a high iron content which might give undesirable or unexpected tones and stained areas to latex wall finishes and the like.

The many varieties of aqueous compounded film-forming (e.g. "paint") latices suitable for use in accordance with my invention represent a far broader class than has ever been available before for making conventionally packaged latex paints or dry powdered synthetic resin dispersions suitable for compounding into latex paints. Thus, latices which react in storage with metalliferous components of conventional pigment ingredients such as titania, clay, elemental metals, carbonates, and the like, can be employed here with impunity, e.g., the maleic half-esters of styrene (maleic-styrene adducts), methacrylic or acrylic resins or other acid-reacting resins in combination with epoxy or amino resins which ordinarily are alkali sensitive, etc. Broadly the most suitable latices have a small particle size so as to fuse and become film-forming, and to exhibit good pigment binding qualities, e.g., averaging about 0.5 micron or smaller, with the average vinyl acetate resin particle size being permissively somewhat greater than most of the others, up to about 0.5–5.0 micron.

The latices employed in my paint concentrate can render the resulting paint suitable for virtually any sort of application, e.g., outdoor application as well as interior finishing. The patent art is replete with details about suitable latices for aqueous emulsion paints, their processes of manufacture, and their compounding with stabilizers and various suitable additives, e.g., 2,498,712; 2,676,930; 2,700,026; 2,702,284; 2,728,737; 2,731,434; 2,731,435; 2,739,136; 2,773,849; 2,807,597; 2,809,950; 2,833,737; 2,837,444; 2,852,475; 2,852,476; 2,868,752; 2,875,166; 2,881,143; 2,883,355; 2,884,397; 2,886,546; 2,887,460; 2,888,421; 2,888,422; 2,888,505; 2,889,236; 2,889,314; 2,892,802; 2,894,927; 2,895,930; 2,897,100; 2,897,165; 2,899,397; 2,905,649; 2,907,720; 2,902,721; 2,904,523; 2,912,399; 2,913,429; 2,914,497; 2,917,476; 2,921,046; 2,922,781; 2,933,467; 2,933,469; 2,934,529; 2,936,295; and 2,937,156.

For efficiency and economy in the practice of the invention coupled with excellent durability of finish, I prefer to use an aqueous compounded latex containing between about 30 and about 65% of vinyl acetate-lower alkyl acrylate ester copolymer solids having vinyl acetate/acrylate monomer mole ratio between about 2:1 and 9:1; and especially one containing approximately 50% of such copolymer solids wherein the acrylate is 2-ethyl-hexyl acrylate and said mole ratio is between about 3:1 and 6:1. For even greater economy coupled with good painting performance one can use a vinyl acetate homopolymer aqueous compounded film-forming latex of conventional type.

Conventional hydrocarbon polymer latices are also eminently suited for use in my invention although they are somewhat less hard and grease-resistant and they exhibit more tack than the foregoing specific ones I have mentioned. Thus, I can use butadiene-styrene compounded film-forming latices such as those made of copolymers containing about 30 to 60% butadiene and the balance styrene, isoprene-styrene latices, butadiene vinyl toluene latices (suitably with a drier such as cobalt acetate in the accompanying package of pigment base to obtain a quicker cure than has heretofore been possible in conventional latex paints using similar latices).

I can also use various acrylic latices, e.g., those made from polymers of methacrylic acid, acrylic acid, and their mixtures, copolymers and terpolymers of methacrylic acid esters with styrene and/or vinyl acetate, or copolymers and terpolymers of methacrylic acid esters with acrylic acid esters and/or acrylonitrile. Other suitable latices include emulsion copolymerizates such as those of bodied oils and vinylic monomers as are represented by and shown in U.S. Patent 2,926,151.

Also suitable are aqueous emulsions of polyvinyl chloride latices, particularly those plasticized with conventional plasticizers such as 2-ethyl hexanol or 2-ethoxy-ethanol-1 and latices of copolymers of vinyl and vinylidene chloride. Aqueous emulsions of alkyd resins and modified alkyds are also useful, e.g., the reaction products of polyhydric alcohols with polybasic acids and those modified, for example, with fatty acids, styrene, and acrylics; natural or reclaim rubber emulsions; emulsions of organic polysulfide polymers such as "Thiokol" (i.e., the reaction products of sodium polysulfides and unsaturated organic dihalides), polyethylene emulsions, emulsions of chlorinated or fluorinated polyethylene and emulsions of chlorosulfonated polyethylene; polypropylene latices containing a fusing agent such as the plasticizer 2-ethoxyethanol-1, and compatible resin mixtures and copolymers of two or more of the foregoing specific monomer types.

In summary, then, suitable emulsions include those of vinyl resins by which I mean to include vinyl acetate, vinyl chloride, vinylidene chloride, and the like; those of hydrocarbon polymers and copolymers, polyethylene, polypropylene and oxygenated or halogenated derivatives of same by which I mean to include polybutadiene, oxygenated polybutadiene polyisoprene, oxygenated polyisoprene, butadiene-styrene, butadiene-vinyl toluene, isoprene-styrene and the like; acrylic latices by which I mean to include polymers and copolymers containing units of acrylic acid, methacrylic acid, their esters, and acrylonitrile; alkyds; reaction products of vinylic hydrocarbon monomers with unsaturated materials such as the reaction product of maleic acid with styrene; and, broadly, the various other resinous and rubber-like elastomeric products which are obtainable in stable aqueous latex form and are capable of coalescing into a pigmented film when brushed, sprayed, or rolled onto a surface at ordinary room conditions, i.e., 75° F., 25% relative humidity, and one atmosphere total pressure.

As is well known in the art the suitable stable aqueous latices are ordinarily made by emulsion polymerization, and usually they must not be compounded with certain water-soluble solvents such as lower alkanols, 2-ethoxy-ethanol-1, dioxane, and the like, elemental copper, flake or pulverized aluminum or conventional pastes thereof, most intumescent salts, most multivalent ions, alkali such as caustic soda in the case of vinyl acetate resins, borax, and a host of other metal compounds, particularly salts which render the latex unstable or unsafe.

The compounded latex will tolerate, however, water, hydrophilic protective colloids such as water soluble hydroxy ethylcellulose, carboxymethyl cellulose, sodium caseinate, natural gums such as gum tragacanth, locust bean gum, karaya gum, guar gum, Irish moss gum, and alkali metal alginates; small amounts of low boiling hydrocarbon solvents such as $C_{6-9}$ aliphatics (generally referred to as naphthas) for reduction of foaming, various surfactants, e.g., anionics such as sodium dodecyl benzene sulfate and sodium dodecyl benzene sulfonate, nonionics such as iso-octyl phenoxy polyethoxy ethanol, cationics such as dimethyl-stearamidopropyl-2-hydroxy ethyl ammonium dihydrogen sulfate, ampholytics such as coconut fatty acid amide condensates, etc., freeze-thaw recovery agents such as the lower alkylene glycols, alkali-fast colorants such as Hansa yellow dyes, phthalocyanine blues and greens, red or yellow oxide of iron toners, and toluidine reds.

Ordinarily, the latices are supplied from the manufacturer with some or all of these ingredients, and also can have in them a fungicide, a thickener-stabilizer such as methylcellulose thickener, a starch phosphate, and a dispersant such as pine oil or low molecular weight lignin sulfonates, e.g., those suitably between 10,000 and 40,000 M.W., various surfactants, e.g., non-ionic agents such as iso-octyl or nonyl phenoxy polyethoxy ethanol wherein the number of equivalent ethylene oxide units in the molecule averages between 9 and 10 per mole of alkylated phenol dioctyl sulfosuccinate, and anionic soaps such as sodium dodecyl benzene sulfonate customarily are in the latex as supplied.

While it is apparent from the foregoing that some dispersing assistant, some bodying agent, and all of the colorant can be present in the compounded latex of my combination, a significant fraction and preferably the major portion or all of the bodying agent (and a significant fraction of any dispersing assistant which can be needed or be desirable) must be present in the pigment base unit of the combination because the combination is primarily for custom blending with a minimum of equipment, e.g., a simple paddle or shaker instead of the more rigorous and elaborate conventional latex emulsion paint plant equipment. Very little energy is necessary to convert my concentrate and water into a good latex paint even though the problems of rheology, dispersion, and viscosity control are somewhat different and more critical than those encountered in the conventional preparation of latex emulsion paints.

Accordingly, the bodying agent in the pigment base unit should be dispersible to form at least a colloidal suspension and, preferably, be soluble in water. The preferred one is hydroxy ethyl cellulose in a proportion broadly between 0.1 and 5%, and preferably between 0.8 and 2% based on the weight of the total pigment base used in the combination. In general, a lower proportion of bodying agent can be used when the ratio of latex solids:pigment base is in the high range of the limits stated.

The most suitable grade of hydroxy ethyl cellulose for incorporation into my pigment base unit is a highly viscous one, i.e., one having at least about 100 centipoises viscosity (at 20° C. in 2% aqueous solution), advantageously 200–25,000 centipoises, and preferably between about 3500 and about 6500 centipoises. The use of hydroxy ethyl cellulose of higher viscosity than 25,000 makes its blending and incorporation into the pigment base somewhat difficult, but not impossible. However, the use of hydroxy ethyl cellulose of substantially lower viscosity than about 100 centipoises in the pigment base should be avoided so that small enough proportions of this bodying agent can be effective without imparting poor water resistance to the resulting paint. The hydroxy ethyl cellulose is, of course, made in grades giving as low as an 8–12 centipoise viscosity (when in 2% aqueous solution at 20° C.) and these lower viscosity grades, that is, below 100 centipoises, and suitably in the range of 8–12 centipoises make an excellent protective colloid for use in the compounded aqueous latex.

Other suitable bodying agents for the pigment base which can be used for compounding with the pigment unit for my combination include water soluble methyl cellulose, suitably of 400 centipoises viscosity (2% in water solution at 20° C.), alkali metal salts such as sodium carboxy methyl cellulose, bentonite clay, and alkali metal caseinates exhibiting similar viscosity characteristics, their principal disadvantages being that they often are harder to disperse in water than hydroxy ethyl cellulose, give poorer flow characteristics to the resulting paint, and/or they require about double the proportion that I have found to be especially effective for hydroxy ethyl cellulose. Still other water-soluble colloidal materials such as easily water-soluble natural gums, including gum tragacanth, locust bean gum, Karaya gum, guar gum, Irish moss gum, an alkali metal alginates also can be used in the practice of my invention but they are susceptible to bacterial spoilage and require a substantially larger proportion to achieve the same desirable effects when associated with the pigment in my pigment base and are, therefore, considerably less advantageous.

Yet other useful bodying agents include carboxy methyl dextran as shown in U.S. Patent 2,854,421, sodium polyacrylates, ethylene oxide polymers, and polyacrylamide, the 2% aqueous solution viscosity of the most suitable ones being at least 100 centipoises and advantageously higher. The ethylene oxide, acrylate, and acrylamide polymers, e.g., those having molecular weight between 100,000 and 5,000,000, are substantially less desirable than hydroxy ethyl cellulose in my combination because I have found that the paint made from concentrates of my invention using them tends to leave brush marks.

I have found that an important consideration for effective and easy dispersibility is that the bodying agent be of quite small particle size when used in the preferred solid state, i.e., preferably not substantially above about 150 microns diameter and preferably actually milled with and onto the pigment base particles. Thus, I have found that reduction of the particle size of the bodying agent to 150 microns or less and mixing it with or actually milling it onto the pigment helps in eliminating lumpiness in the resulting paint when the paint is made up using a simple paddle stirrer with hand stirring as would be done in the ordinary domestic situation. Grinding it with the pigment, or applying it to the pigment in aqueous colloidal dispersion or in water solution are also effective techniques here.

The dispersing assistant in the preferred pigment base unit containing a white pigmentary material is advantageously an alkali metal phosphate, preferably 0.01 to 0.3% and even more preferably 0.05–0.2% of sodium hexametaphosphate. Tetrasodium pyrophosphate and trisodium phosphate also can be used. These proportions are based on the weight of the pigment base unit and are exclusive of the amount of dispersing assistant in the aqueous compounded latex. Other dispersing assistants I can employ include pine oil, lecithin, anionic surfactants such as dodecyl benzene sodium sulphate, or dodecyl benzene diethanol amine; nonionic surfactants such as a higher alkyl phenoxy polyethoxy ethanol having 8–24 ethylene oxide units per mole of the alkyl phenol; and the sodium or ammonium salts of sulfate esters of such nonionic surfactants (which converts them, therefore, into anionic ones). Effective proportions of such surfactants are generally a little higher than those for the alkali metal phosphate dispersing assistants. Use of too great a proportion of such dispersing assistant or assistants causes the resulting paint to have poor water resistance. Dispersion of the pigment base unit also can be aided materially by the selection of especially high water-dispersible grades of solid pigmentary materials such as a rutile titania that has been calcined in the presence of potassium salts and phosphoric acid or ammonium phosphate to leave a phosphate residue of about 0.25% on the titania.

In general, because of the avoidance of proteinaceous material in my pigment base unit, it is not necessary to include in it as much in the way of a special preservative against microbial or fungus attack, but these can be included if desired. It is advantageous, however, to put such preservatives in the compounded latex, e.g., phenyl mercury compounds (acetate, propionate, etc.). Surface active oils such as pine oil and tributyl phosphate are also useful dispersing agents in the pigment base, particularly in a range between 0.1 and 1% and preferably about 0.2–0.3% based on the weight of the pigment base unit. If desired, however, some of the pine oil or other surface active oil can be left out of the pigment base unit and put in the compounded latex, if desired.

Suitable colorants for the aqueous latex include metallic phthalocyanine and similar pigments, Hansa yellows, toluidine toners, etc. dispersed in 2-ethoxy-ethanol-1 or the like with an anionic surfactant such as a higher alkyl phenoxy polyethoxy ethanol having an average of 8–14 ethylene oxide units per mole of the alkyl phenol. Alternatively, these can be added directly to the paint such as a white paint made from my concentrate to give a desired tone.

For improving resistance to efflorescence in masonry coatings I can dose the paint concentrate of my invention with various polyoxyalkylene alkanol nonionic surfactants to obtain the equivalent of 0.25–8% of the surfactant based on the weight of finished paint made from the concentrate, that is, between roughly 0.4 and 10% by weight on the weight of concentrate per se. The nonionic surfactant can be added to and milled with the pigment base unit or a portion thereof, but more conveniently is added to the aqueous compounded latex. Of course, portions of the nonionic can be put in both places. If substantially less than the foregoing proportion of nonionic surfactant is used there is little effect on suppressing efflorescence from masonry, and if substantially more than the foregoing proportion is used the resulting paint film is in danger of being water-sensitive, that is, lacking in water resistance.

Suitable nonionic surfactants for this service are disclosed in my co-pending U.S. patent application S.N. 695,535, filed on November 12, 1957, and they include the various commonly available agents sold under the names Tween (Atlas Powder Co.), Emulphor EL and ON (Antara Chemical Co.), Nopalcol 6-0 (Nopco Chemical Co.), the Triton X series (Rohm & Haas), Igepal CO and CA products (Antara Chemical Co.), Pluronics and Tetronics (Wyandotte Chemicals Co.), and other related trademarked and tradenamed items shown in that specification, the disclosure of which is expressly incorporated herein in connection with the suppression of efflorescence.

The pigment base unit is preferably in powder form ostensibly dry to the touch although it is recognized that various pigmentary ingredients can have a small measure of free or bound water in their constitution. Alternatively, a very satisfactory pigment base unit can be in the form of one or more compressed, water-disintegrable pellets or bricks for compactness. In powder form it is convenient to package the loose powder base unit in containers such as one or more paper bags. In the pellet or brick form a single or several pieces can constitute the pigment base unit, acting, in effect, as a package or packages by virtue of cohesion in storage. Alternatively also, the pigment base unit can be in the form of a packaged paste or other dispersion, or in any combination of powder, pellet, brick, paste. and dispersion.

The term "pigment base unit" is intended to describe an overall measure of pigment base proportioned for blending with the particular package or plurality of packages of latex discrete therefrom in the concentrate combination and the necessary additional water to constitute a predetermined amount of aqueous latex emulsion paint having the latex solids:pigment base ratio hereinbefore stated. The pigment base unit can consist of one or more individual packages, pellets, bricks, or a mixture of same. The pigment base unit measure in my combination includes, then: any mineral or synthetic pigmentary components used, e.g., titania, clay, mica, etc.; any metallescent materials used, e.g., aluminum powder; any intumescent material used; the bodying agent intimately associated with any of these components; and such colorants, dispersing assistants, preservatives, pesticides, etc., as are in intimate association with any of the foregoing pigment base components.

It is expected that the predetermined amount of aqueous latex emulsion paint made from a particular concentrate combination of my invention ordinarily will be quite small, i.e., about a quart to about 50 gallons, for general domestic and maintenance applications; accordingly, the overall amounts of the pigment base unit and the aqueous compounded latex package unit or units proportioned thereto and dispensed as the combination will be correspondingly small. This, of course, also is in order for ease of manual mixing, handling, and tinting of the concentrate. However, particularly for industrial and large project applications, the pigment base unit and corresponding quantity of aqueous compounded latex dispensed as the combination can be of moderate to large size, e.g., sufficient for making 100–500 gallons or even more of paint, suitable for mechanical handling and mixing at or near the point of use.

Alternatively, e.g., at a branch store, a multiplicity of small pigment base units and a large tank of suitable aqueous compounded latex can be stocked. In such instance the storekeeper can mete out an appropriate quantity of the latex into packages proportioned in size to the pigment base unit being dispensed. If desired he can custom mix the paint from the combination he had made right in his shop, tint it to the customer's liking, and deliver it in a suitable container which also can act as a paint pot.

The preferred pigmentary solids of the pigment base for general use comprises pigment-size titania (the ideal being between 0.2 and 0.4 micron in size), kaolinite clay, silica, talc, and mica. Suitably, the bodying agent or agents and dispersing assistant or mixture thereof is milled with these mineral materials to blend the pigment base components thoroughly. In the preferred pigment base unit for general service in the making of a concentrate for white latex emulsion paint I can use between 15% and 60% rutile titania, between 20% and 50% clay, between 10% and 30% talc, between 0% and 20% pigmentary silica, and between 5% and 20% mica, all of these percentages being weight percentages based on the weight of the pigment base unit.

Advantageously, the clay is in the form of plate-like particles averaging 0.6–12 microns, and preferably it is in the form of stacks of plates somewhat larger than is conventionally used for making ordinary latex emulsion paints. That is, I prefer an average particle size between 6 and 11 microns and especially about 9½ microns.

The talc of the preferred sort is of needle-like particle shape broadly between 1 and 28 microns in size and averaging about 7 microns in size. Alternatively and very satisfactorily the talc can be replaced by Wollastonite milled to about the same dimensions to give even better wetting properties than talc to the pigment base unit. If special speedy wetting characteristics are needed in particular applications, a conventional nonionic surfactant can be milled onto the mineral pigmentary material, or extender or both.

The preferred mica assists in dispersing the titania and is in plate form. It can have a size range between about 1½ and 30 microns and averages about 10–11 microns. I have found that the dissimilarity of pigment shape and size, ranging from 0.2 to 30 microns materially assists in dispersing the pigment unit of my combination in water for making latex emulsion paint.

This is a distinct departure from conventional practice for making aqueous latex paints wherein the average size for pigments other than titania is generally between 5 and 15 microns. The clay particularly is somewhat larger than conventional in particle size and preferably is a kaolinite because kaolinite has a lower water absorption than most other common pigmentary clays.

Other suitable extenders which can be used are carbonates such as calcium carbonate and pigmentary silica (which is generally spherical in shape and has a size grading about 50% of it not over 10 microns in size).

Such silica is excellent as the main mineral pigment for making a concentrate suitable for an aqueous latex sealer to be used under varnish. While many other pigmentary materials can be included in my pigment base, e.g., fuller's earth, diatomaceous silica, etc., I have found that these have poor water absorption characteristics, and therefore I prefer to avoid them because their use tends to give a latex paint which preserves brush marks. Barium sulfate can also be used as a pigmentary extender.

In addition to, or replacement of, pigmentary rutile titania, and especially that of the best water-dispersible grades, I can use other pigmentary whites for special application or where particular economy is desired, e.g., anatase titania, zinc oxide, leaded zinc oxide, white lead, titanium calcium (a composition of titanium dioxide and calcium sulfate), lithopone, and other conventional whites.

The pigment can impart color to the resulting paint made from my concentrate also although as pointed out above, the paint concentrate is far more versatile with respect to tints when either a white latex emulsion paint made from the concentrate is tinted with a special additive or when the latex itself is tinted to impart the dominating hue to the resultant paint. Various pigments, however, which I can employ to color and be a part of the pigment base unit include: ferrite yellow oxide, ferric oxide, "brown" iron oxide (which is a blend of red, yellow, and black iron oxides), tan oxide of iron, which is a similar blend, raw sienna and burnt sienna, raw and burnt umber, chromium oxide green, phthalocyanine green (chlorinated copper phthalonitrile), the green iron salt of nitroso beta naphthol, copper phthalonitrile blue, ultramarine blue, carbon black, lampblack, toluidine red, parachlor red, para toner (red), alkali resistant red, BON red and maroon, cadmium reds and yellows, Watchung red, madder lake (red), Duratone red, carmine red, chrome yellow (lead chromate), chrome orange, Hansa yellows (which are azo couplings of meta-nitroparatoluidine and acetoacetanilide), and golden nickel azo complexes such as those shown in U.S. Patent 2,396,327.

The pigmentary portion of the pigment base unit can also comprise various specially treated materials such as a pigmented resin or a pigment dispersion in water, nacreous graphite, etc. Suitable specialty pigments for incorporating into or constituing the pigment base of my combination are shown in the following patents: 2,539,429; 2,613,158; 2,613,159; 2,637,711; 2,722,485; 2,749,248; 2,780,612; 2,875,076; and 2,932,580.

As hereinbefore mentioned suitable metallescent, intumescent, and otherwise storage-sensitizing ingredients towards aqueous latex can be incorporated directly into the pigment unit by packaging together, or they can be supplied extraneously from or as a discrete package part of my paint concentrate. Specially treated metallescent materials suitable for intimately mixing with my pigment unit or being supplied to supplement it in a package separate from both the aqueous latex and the balance of pigment base unit are shown in numerous publications, e.g., U.S. Patents 2,234,164; 2,528,034; 2,587,266; 2,587,267; and 2,666,714.

Some metallescent materials, e.g., aluminum powder, need no dispersing assistant to be satisfactory for use in my invention. Actually, contact of alkali materials such as the sodium phosphates should be avoided with aluminum metal. A suitable pigment base unit for making aluminum paint concentrate in accordance with my invention can consist of finely-divided elemental aluminum and water-dispersible bodying agent, e.g., hydroxy ethyl cellulose and/or other foregoing ones in the proportions recited. The aluminum can be extended with mica, if desired. Alternatively, when dispersing assistants are desired for part of the pigment base components and there is a risk of reaction with others in extended storage, the dispersing assistant-treated pigment components can be packaged separately from the untreated.

The pigment base unit of my invention can tolerate colorants and dyes. The unit must have in it also water-insoluble pigmentary material and water-dispersible collodial bodying agent to be satisfactory for my concentrate. Things that are to be avoided in intimate association with the rest of the pigment base unit are moisture-contributing agents such as certain humectants and deliquescent salts which tend to cause lumping of the bodying agent and associated materials, rendering the pigment base difficult to disperse in water, and ingredients which tend to react with fractions of the pigment in prolonged storage, e.g., acidic material which would react with carbonates present, basic materials which would react with aluminum metal, etc. Separate packaging of storage-sensitive pigment base unit components can be used in some instances to overcome these problems in accordance with my invention principles.

The criteria for good aqueous latex paint are outlined broadly. The paint should develop a good scrub resistance in at least about 24 hours (which can be tested by a standard machine such as a Gardiner straight line scrubber machine using a one-pound brush or, more simply and preferably, stroking 200 times with a wet rag containing a high quality neutral soap such as "Ivory" brand). A superior paint will lose no discernible film in this treatment, but instead just the dirt thereon. Marks from lead pencil, wax crayons, and lipstick ordinarily will be removed in 3 to 30 strokes. The paint should air-dry at room temperature and down to temperatures as low as about 50° F. It should be easy to brush onto the work, give a non-streaked impression of color (which is a function of how well the vehicle maintains the paint dispersion and how easy it is to get the paint components adequately dispersed by simple paddle mixing). When applied, the paint should have a hold-open time of a few minutes under ordinary room conditions, that is, the time the film stays wet so that the joints can be successively lapped-over as painting progresses without leaving significant lapping marks. The viscosity of the mixed paint should be such that it does not readily run or drip off a brush or roller, nor "spit" or foam under the roller when being applied. The film should not be lumpy.

The following examples show ways in which my invention has been practiced but should not be construed as limiting the invention. The particular paints compounded from my concentrate as shown were mixed in open vessels for brushing therefrom and, in most cases, could be thinned for spraying. The foregoing criteria for good latex emulsion paints were met (and exceeded in most instances), and it was also noted that the paint was easier to apply by brush and usually had a longer (and therefore better) hold-open time than a high-grade ready-mixed aqueous latex emulsion paint made in conventional manner. Furthermore, I found many of the experimental paints to have extremely good stability after hand mixing the concentrate with water using a simple paddle stirrer for a few minutes. In other words, there was no stratification in the paint mixed from the concentrate even after months of storage and observation. Actually, I found that a short waiting period such as 30 minutes after the mixing was advantageous in permitting such lumps as were present to soak out and disappear. All percentages, parts, ratios, and fractions in this application are by weight unless otherwise expressly indicated.

*Example 1*

An aqueous latex was made by emulsion polymerization of vinyl acetate monomer and 2-ethyl hexyl acrylate monomer by feeding these monomers into the balance of the mixture which was agitated and heated to 140° F. to initiate the reaction. The kettle used was equipped with a distilling column maintained at total reflux. The reaction period was 14–16 hours. The proportions of reaction mixture were as follows:

| | Lbs. |
|---|---|
| Deionized water | 100.00 |
| Sodium bicarbonate | 0.47 |
| Sodium dodecylbenzene sulfonate | 1.51 |
| Nonionic surfactant [1] | 3.67 |
| Hydroxy ethyl cellulose having in 2% water solution at 20° C. a viscosity of 8–12 cps. | 1.00 |
| Potassium persulfate | 0.23 |
| 2-ethyl hexyl acrylate monomer | 18.00 |
| Vinyl acetate monomer [2] | 82.00 |

[1] A blend of 1.51 lbs. of iso-octyl phenoxy polyethoxy ethanol containing 9 to 10 ethylene oxide units per mole of the alkyl phenol and 2.16 lbs. of a similar compound except that it contained about double the moles of ethylene oxide units per mole of the alkyl phenol.
[2] Stabilized with 0.002% of hydroquinone.

An 1143-gram portion of the resulting aqueous latex, containing about 50% latex solids, was further compounded with 4 grams of pine oil, and this compounded material was maintained in a discrete package as one ingredient of my paint concentrate.

A pigment base was made of the following listed components by pre-mixing them in a hammer mill in the following proportions:

| | Grams |
|---|---|
| Classified kaolinite clay having particle size range between 1.4 and 20 microns and averaging 9.5 microns, the conformation of which was stacks of plate-like particles. Virtually no particles were smaller than 2 microns | 510 |
| Talc (calcium silicate) having an average particle size of 7 microns and a size range between 1.55 and 28 microns, needle-like particles | 305 |
| White muscovite mica having average particle size of 10–11 microns | 163 |
| Pine oil dispersant | 5 |
| Hydroxy ethyl cellulose of particle size 100 mesh (U.S.S.) and finer, having 98.5% water solubility and viscosity in 2% aqueous solution of 3500–5000 centipoises at 20° C.[1] | 20 |
| Rutile pigmentary titania | 775 |
| Sodium hexametaphosphate powder | 1.5 |
| Sodium ortho phenyl phenol (a pesticide) | 5 |
| | 1784.5 |

[1] Milled "Cellosize WP-4400" a product of Union Carbide Co. having pH at 25° C. in 2% aqueous solution of 6–8, maximum ash content of 6%, and maximum water content of 5%.

The pigment base unit of the foregoing pigment weighed 1784.5 grams and was put into a paper bag. This pigment base powder was emptied from the bag and stirred into a lacquered paper container holding at the time 2013 grams of water (the water having been added to a mark at that predetermined level). Handpowdered paddle stirring was used for about 5 minutes, then the 1147 gram compounded latex package was emptied into the slurry. The stirring was continued for another minute or two whereby manifest homogeneity of the mixture occurred and a gallon of white latex emulsion paint was formed.

After about 5 minutes of standing, the paint was brushed out on a test board. It demonstrated an excellent ease of application, non-streaking, a hold-open time of about 5 minutes, and a viscosity which prevented the paint from dripping or running off the brush. A few lumps which were apparent were easily brushed out of the paint. It air-dried to give superior scrub resistance after about 15 minutes drying (200 strokes with a wet rag in soap to eliminate marks made by lead pencil, wax crayon, and lipstick).

*Example 2*

In this preparation the aqueous compounded latex unit was a container holding 725 grams of the same kind of emulsion polymerization reaction product as shown in Example 1 and 5 grams of pine oil. The pigment unit was a package of pulverulent white pigment made in the same way and of the same kind of materials as the pigment base unit shown in Example 1, the proportions being:

| | Grams |
|---|---|
| Georgia kaolinite | 625 |
| Talc | 375 |
| Mica | 200 |
| Pine oil | 5 |
| Hydroxy ethyl cellulose | 25 |
| Rutile titania | 525 |
| Sodium hexametaphosphate | 1.5 |
| Sodium ortho phenyl phenol | 5 |

The package of pigment unit was emptied into a mixing container containing 2465 grams of water and stirred by hand with a paddle for about a minute. Then the 730-gram package of aqueous compounded latex was emptied into the slurry and the stirring continued for about a minute whereby a gallon of aqueous latex emulsion paint was made. This had essentially the same characteristics as those demonstrated by the paint of Example 1.

*Example 3*

To 1575 grams of the white pigment base made like that of Example 2 there was mixed pigmentary particles of: 143 grams of red iron oxide, 28 grams of red toluidine toner (an azo pigment coupling of meta-nitro-para-toluidine and beta-naphthol) and 14 grams of ferrite yellow oxide (hydrated ferric oxide). Using the resulting pigment unit (of 1760 grams) with a package of 730 grams of compounded latex of the sort used in Example 2 blended into 2465 grams of water in the manner of Example 2 there resulted a gallon of red aqueous emulsion paint having the desirable properties shown in Example 1.

*Example 4*

A yellow pigment base unit was made by mixing 71 grams of Hansa yellow (an azo coupling of meta-nitro-para-toluidine and acetoacetanilide), 14 grams of ferrite yellow and 1672 grams of the white pigment mixture of the kind used in Example 2. A gallon of yellow paint was made from this pigment and aqueous compounded latex in the same manner as Example 3. It exhibited the desirable aqueous latex emulsion paint properties shown in Example 1.

*Example 5*

In a further preparation a pigment base unit was made from 1520 grams of the white pigment base like that of Example 2 plus 198 grams of burnt umber and 43 grams of ferrite yellow pigment. When mixed with water and aqueous compounded latex like the pigment base unit of Example 3, a gallon of brown aqueous latex emulsion paint was made. It exhibited the desirable characteristics of the paint shown in Example 1.

*Example 6*

A package of white aqueous compounded latex like that of Example 2 was tinted blue with 2 ounces of a 10% dispersion of copper phthalocyanine toner, the suspending agent for the pigment in this toner being 67% 2-ethoxy-ethanol-1 and 33% of the nonionic surfactant iso-octyl-phenoxy polyethoxy ethanol having an average of 9–10 ethylene oxide units per mole of alkylated phenol. The resulting tinted latex was mixed with 1761.5 grams of a pigment base unit like that of Example 2 and 2465 grams of water to give a gallon of an excellent blue aqueous latex emulsion paint. It performed essentially like the paint of Example 1 except that it was slightly less scrubbable.

*Example 7*

In a similar preparation to that of Example 6 the latex was tinted red with red toluidine toner pigment (an azo pigment coupling of meta-nitro-para toluidine and beta naphthol) similarly suspended in 2-ethoxy-ethanol-1 and nonionic surfactant to give a red aqueous latex emulsion paint of essentially the same characteristics as that of Example 6.

Example 8

Additionally, batches of white paint made like that of Example 2 were tinted individually in the proportion of 2 ounces per gallon with the foregoing blue and red toners of Examples 6 and 7, respectively, and the paints were essentially the same in characteristics as their counterparts in Examples 6 and 7.

Example 9

A pigment base was made of the following list of components by mixing them in a hammer mill:

| | Grams |
|---|---|
| White muscovite mica, plate-like, water ground particles passing a 325 mesh U.S.S. sieve | 300 |
| Aluminum powder (Reynolds Metals Co. 4-591 litho powder grade) | 300 |
| Hydroxy ethyl cellulose of particle size 100 mesh U.S.S. and finer, having 98.5% water solubility and viscosity in 2% aqueous solution of 3500 to 5000 centipoises at 20° C. | 35 |
| Pine oil (dispersant) | 5 |
| Iso-octyl phenoxy polyethoxy ethanol having 9 to 10 ethylene oxide units per mole of the alkyl phenol (dispersant) | 5 |

The so-made pigment base unit weighed 645 grams and was put into a container. The aqueous compounded latex package was a container of 730 grams of an emulsion polymerization reaction product like that of Example 1 and 5 grams of pine oil as an antifoam agent.

The pigment base unit was stirred by hand paddle into an open vessel containing 2465 grams of water and the compounded latex quantity, weighing 735 grams, was added thereafter. The stirring was continued for a few minutes until manifest homogeneity of the mixture occurred and about a gallon of aluminum aqueous latex emulsion paint resulted. The resulting paint did not tend to settle out on standing and brushed easily onto a cardboard to give an excellent aluminum paint film having a definite aluminum shine. There was no dangerous gassing from the mixture.

Cheaper grades of mica (e.g., not water ground) can be substituted for the foregoing high grade mica to give an aluminum paint of a duller aluminum color without sacrificing scrubbability and other desirable latex paint characteristics which the exemplary preparation had.

In further tests the hydroxy ethyl cellulose and the dispersants in the above listed formulation were varied, using 25 grams of the hydroxy ethyl cellulose instead of 35 grams in the pigment unit and 5 grams of tributyl phosphate dispersant, in place of pine oil in the latex in the second instance, and 50 grams of hydroxy ethyl cellulose in the pigment unit with no dispersant in a third instance. With the lower hydroxy ethyl cellulose quantity the resulting aluminum paint, made in the same way as the first one, exhibited even better brushability. With the higher hydroxy ethyl cellulose quantity, the paint made otherwise like the first one gave a slightly thicker paint, and the pigment base unit took a few additional minutes of mixing to obtain satisfactory dispersion of what was otherwise an excellent aluminum aqueous latex paint. No explosion hazards were encountered.

Further variations can be practiced with the above tabulated formulation. Thus, the mica can be left out entirely as can the dispersants (dispersing assistants), and from 300 to 600 grams of aluminum powder be used. When the mica is left out it is best to replace a portion of it with some additional aluminum powder, e.g., 100–150 grams.

Example 10

In this preparation the pigment base unit was made like that of the tabulated one in Example 9 except that all of the aluminum powder was replaced by an equal weight of the kind of classified kaolinite clay described in Example 1 and the mica used was the cheaper one (not water ground) like that described in Example 1, the total mineral pigment of the pigment base unit thereby weighing 600 grams. When this pigment unit was compounded with water and an aqueous compounded latex of the same kind and amount as used in the tabulated preparation of Example 9 there resulted an excellent aqueous latex wood sealer for varnish. When this sealer was applied to plywood panels and air dried, varnish applied thereover did not sink in but rather exhibited excellent hold-out and fullness. A similar sealer can be made substituting pigmentary silica for some or all of the mineral components of the pigment base unit.

Example 11

Aqueous compounded latex used in the following example was 725 grams of the same kind of emulsion polymerization reaction product as shown in Example 1 and 5 grams of pine oil to which was added 10 grams of the same kind of hydroxy ethyl cellulose as shown in the tabulated example of Example 9 (except that it had been dissolved in water to form a 3% solution and added that way) and 5 grams of the nonionic surfactant, iso-octyl phenoxy polyethoxy ethanol containing 9 to 10 ethylene oxide units per mole of the alkyl phenol. The later additions were helpful in stabilizing the latex against coagulation in mass because of the high proportion of salt used in the pigment base unit described below.

The pigment base unit was made of the following list of components mixed in a hammer mill:

| | Grams |
|---|---|
| Ammonium dihydrogen sulphate | 500 |
| Dicyandiamide | 300 |
| Pentaerythritol humectant | 200 |
| Corn starch | 200 |
| Kaolinite clay like that shown in Example 1 | 100 |
| Mica like that shown in Example 1 | 200 |
| Pine oil | 2 |
| Hydroxy ethyl cellulose like that shown in the pigment base unit of Example 1 | 30 |
| Pigmentary rutile titania | 200 |
| Sodium ortho phenyl phenol (pesticide) | 5 |
| Sodium hexametaphosphate powder | 0.5 |

The foregoing dry ground material constituted the pigment unit. It was dispersed in 1675 grams of water with hand paddle stirring and to this was added the special aqueous compounded latex described. In a few minutes about a gallon of an excellent, stable, and scrubbable intumescent paint was obtained. It was brushed on boards and allowed to air dry. A gas flame was played on the painted boards for a few seconds whereby a carbon foam rapidly resulted, the ash rise being ⅛ to ¼ of an inch and keeping the board from scorching. This showed that the intumescent paint so formed would give excellent temporary protection to the wood against short exposure to hot gases or flame.

In further intumescent preparations like the foregoing the phenolic pesticide was reduced to 1 gram and, of course, could be left out entirely without substantially affecting either the performance of the paint or the resistance of the pigment base unit to pest attack in storage (because of the low water content of the pigment base unit).

Another intumescent paint can be made in satisfactory fashion by substituting for the pentaerythritol and dicyandiamide in the above formulation 500 grams of water-soluble dimethylol urea or the dry water-insoluble ("dead burnt") resin polymerized therefrom to the C-stage (to supply nitrogen for intumescence).

Further modifications on the above-tabulated pigment base unit composition could be made by using 100 to 300 grams of mica, little or no clay, and from about 20–40 grams of the hydroxy ethyl cellulose. Still further modifications can be made, e.g., in the aqueous compounded latex, to select various other ones which are specially stable in the presence of intumescent salt materials, e.g., as shown in U.S. Patent 2,917,276 and elsewhere.

I claim:

1. A multiunit concentrate combination for air-drying aqueous emulsion paint comprising as ingredients: a concentrated pigment base unit containing water-insoluble pigment and a water-dispersible colloid bodying agent; and at least one package of aqueous, concentrated compounded film-forming latex, the relative dry weight proportion of latex solids to said pigment base in said combination being between about 1:1 and about 1:9, said combination being adapted for dispersing in a predetermined quantity of additional water for the preparation of a definite volume of aqueous latex emulsion paint.

2. The paint concentrate of claim 1 wherein there is included a material deleterious to said aqueous compounded latex in prolonged storage contact therewith, and said storage-sensitizing material is maintained separate from said latex.

3. The paint concentrate of claim 2 wherein said storage-sensitizing material comprises a metalliferous substance.

4. The paint concentrate of claim 2 wherein the storage-sensitizing material imparts intumescent properties to the finished paint made from the concentrate.

5. The paint concentrate of claim 2 wherein the storage-sensitizing material comprises finely-divided elemental aluminum.

6. The paint concentrate of claim 2 wherein the storage-sensitizing material is an accelerator for the cure of the aqueous compounded latex.

7. The paint concentrate of claim 2 wherein said storage-sensitizing material is packaged independently from both the balance of the pigment base unit and from the aqueous compounded latex.

8. The paint concentrate of claim 2 wherein the said storage-sensitizing material is packaged with the balance of said pigment base unit.

9. The paint concentrate of claim 1 wherein there are a plurality of packages of aqueous compounded film-forming latex per unit of pigment base.

10. The paint concentrate of claim 9 wherein at least one of the several discrete packages of aqueous latex is of a hue suitable for imparting a dominant color to the resulting latex paint.

11. The paint concentrate of claim 9 wherein the several packages of aqueous latex are of the same hue.

12. The paint concentrate of claim 9 wherein the predominant tint of the paint made therefrom is imparted from the aqueous compounded latex.

13. The paint concentrate of claim 1 wherein at least one of the discrete ingredients is retained in a container adapted for mixing all the ingredients of the concentrate with said predetermined quantity of water for the obtention of a definite volume of aqueous latex emulsion paint.

14. The paint concentrate of claim 1 wherein the pigment base contains pigmentary titania.

15. The paint concentrate of claim 1 wherein at least a portion of the pigment base unit is a packaged powder containing at least one pigmentary material selected from the group consisting of titania, clay, talc, silica, and mica.

16. The paint concentrate of claim 14 wherein at least a portion of the pigment base unit is a compressed solid disintegrable in contact with water.

17. The paint concentrate of claim 1 wherein the pigment base unit contains lithopone.

18. The paint concentrate of claim 1 wherein the bodying agent in the pigment base unit is of average particle size not substantially above about 150 microns.

19. The paint concentrate of claim 1 wherein the bodying agent in the pigment base unit is milled with the pigment base.

20. The paint concentrate of claim 1 wherein the pigment base unit contains at least one dispersing assistant selected from the group consisting of anionic, cationic, nonionic, and ampholytic surface-active agents.

21. The paint concentrate of claim 1 wherein the bodying agent is hydroxyethyl cellulose exhibiting solution viscosity of at least about 100 centipoises at 20° C. when in 2% solution concentration in water.

22. The paint concentrate of claim 1 wherein said pigment base unit contains 15 to 60% rutile titania, 20 to 50% clay, 0 to 20% silica, 10 to 30% talc, 5 to 20% mica, 0.1 to 5% hydroxyethyl cellulose, and 0.01 to 0.5% of a sodium phosphate; and said aqueous latex contains 30 to 65% of vinyl acetate-lower alkyl acrylate copolymer solids.

References Cited in the file of this patent

UNITED STATES PATENTS

| | | |
|---|---|---|
| 1,706,335 | Toch | Mar. 19, 1929 |
| 2,677,459 | Ritzenberg | May 4, 1954 |
| 2,709,689 | Herzog et al. | May 31, 1955 |
| 2,719,628 | Ivanoff | Oct. 4, 1955 |
| 2,863,305 | Shepherd | Dec. 9, 1958 |
| 2,917,476 | Peterson et al. | Dec. 15, 1959 |

FOREIGN PATENTS

| | | |
|---|---|---|
| 20,249/34 | Australia | Aug. 19, 1935 |
| 523,247 | Canada | Mar. 27, 1956 |
| 778,237 | Great Britain | July 3, 1957 |

OTHER REFERENCES

"Chemical and Engineering News," pages 4162–4164, October 1954.

UNITED STATES PATENT OFFICE
CERTIFICATE OF CORRECTION

Patent No. 3,116,827  January 7, 1964

Allan E. Gilchrist

It is hereby certified that error appears in the above numbered patent requiring correction and that the said Letters Patent should read as corrected below.

Column 2, line 40, for "or" read -- of --; line 64, for "later" read -- latex --; column 8, line 3, for "an" read -- and --; column 11, line 45, for "constiuting" read -- constituting --; column 12, lines 3 and 4, for "collodial" read -- colloidal --.

Signed and sealed this 9th day of June 1964.

(SEAL)
Attest:

ERNEST W. SWIDER
Attesting Officer

EDWARD J. BRENNER
Commissioner of Patents